US011871050B1

(12) United States Patent
Koceski et al.

(10) Patent No.: US 11,871,050 B1
(45) Date of Patent: Jan. 9, 2024

(54) JUST-IN-TIME DYNAMIC AD INSERTION (DAI)

(71) Applicant: Amazon Technologies, Inc., Seattle, WA (US)

(72) Inventors: Kyle Koceski, Seattle, WA (US); Shyam Krishnan Moni, Seattle, WA (US); Varun Chadha, Seattle, WA (US); Yongjun Wu, Bellevue, WA (US); Abhishek Kumar, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 18 days.

(21) Appl. No.: 17/445,225

(22) Filed: Aug. 17, 2021

(51) Int. Cl.
*H04N 21/234* (2011.01)
*H04N 21/2187* (2011.01)
*H04N 21/81* (2011.01)

(52) U.S. Cl.
CPC ... *H04N 21/23424* (2013.01); *H04N 21/2187* (2013.01); *H04N 21/812* (2013.01)

(58) Field of Classification Search
CPC .............................................. H04N 21/23424
See application file for complete search history.

(56) References Cited

U.S. PATENT DOCUMENTS

| | | | | |
|---|---|---|---|---|
| 2010/0199299 | A1* | 8/2010 | Chang | H04N 21/4532 725/32 |
| 2014/0068690 | A1* | 3/2014 | Luthra | H04N 21/4363 725/110 |
| 2014/0230003 | A1* | 8/2014 | Ma | H04N 21/4147 725/115 |
| 2021/0274245 | A1* | 9/2021 | Cava | H04N 21/8586 |
| 2022/0036399 | A1* | 2/2022 | Grover | G06Q 30/0243 |

* cited by examiner

*Primary Examiner* — Michael H Hong
(74) *Attorney, Agent, or Firm* — Weaver Austin Villeneuve & Sampson LLP

(57) ABSTRACT

Some implementations include methods for replacing advertisements that have been inserted into a manifest associated with live streaming and may include receiving a request for a manifest from a player to enable a user to watch a live stream of an event. The request may be received at a first time when the live stream is already in progress. The manifest may be generated to include content fragments associated with the live event and advertisements based on first set of selection criteria. The manifest may be sent to the player to enable the user to watch the live stream. A seek back request may be received from the player to enable the user to watch the live stream at a second time earlier than the first time. The manifest may be updated to replace at least one advertisement with a replacement advertisement selected based on second set of selection criteria.

20 Claims, 8 Drawing Sheets

JUST-IN-TIME DYNAMIC AD INSERTION (DAI)

BACKGROUND

In video streaming, a request for a content may be sent from a player to a content distribution network (CDN). The content may be live content or video on demand (VOD) content. The request may be received by an ad insertion service which may obtain a manifest related to the content from an origin or content server. The manifest may include content fragments and ad breaks. The ad insertion service may insert ads into the ad breaks using an ad decision server. The manifest may then be sent by the ad insertion service to the player to stream the content.

BRIEF DESCRIPTION OF THE DRAWINGS

The included drawings are for illustrative purposes and serve only to provide examples of possible structures and process operations for the disclosed techniques. These drawings in no way limit any changes in form and detail that may be made to implementations by one skilled in the art without departing from the spirit and scope of the disclosure.

DETAILED DESCRIPTION

Figure 1:
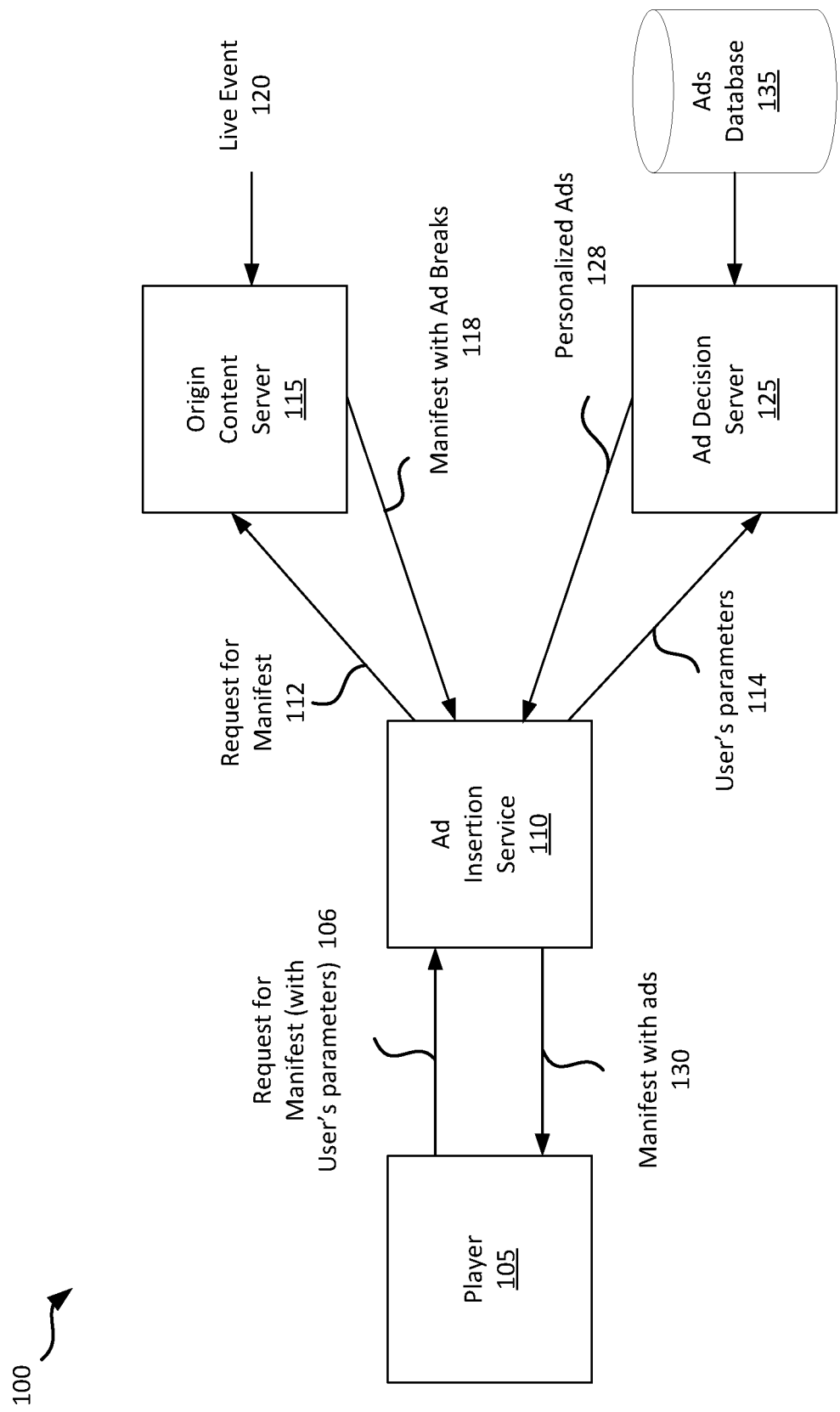
FIG. 1 shows an example diagram of an ad insertion system, in accordance with some implementations.

This disclosure describes techniques for replacing advertisements (or ads) that have been inserted into a manifest. The manifest may be associated with a live stream. The manifest may include content fragments and ad breaks. When an ad break is detected, an insertion service may perform operations to cause an ad to be inserted into the ad break. In some implementations, an ad may be selected for insertion. The selection of the ad may be based on different selection criteria. The manifest may be sent to a player for live streaming based on a streaming format such as Hypertext Transfer Protocol (HTTP) Live Streaming (HLS) or Dynamic Adaptive Streaming over HTTP (DASH). During the live stream, the manifest may continue to grow with content fragments and inserted ads.

In some implementations, when a user joins a live stream that is already in progress, the user may be provided seek back options to watch the live stream starting at an earlier time. In some implementations, when the user initiates a seek back request, the manifest may be updated to include additional content fragments and ads to enable the user to watch the live stream starting at the earlier time.

In some implementations, at least one of the ads in the updated manifest may be replaced with another ad. In some implementations, the ad being replaced may be an ad that has not been watched by the user. In some implementations, the ad used to replace an ad that has not been watched by the user may be selected based on updated selection criteria.

Examples of systems and methods associated with replacing ads in a manifest associated with a live stream will be described with reference to some implementations. These examples are being provided solely to add context and aid in the understanding of the present disclosure. It will thus be apparent to one skilled in the art that the techniques described herein may be practiced without some or all of these specific details. In other instances, well known process operations have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, some implementations. Although these implementations are described in sufficient detail to enable one skilled in the art to practice the disclosure, it is understood that these examples are not limiting, such that other implementations may be used and changes may be made without departing from the spirit and scope of the disclosure.

Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

FIG. 1 shows an example diagram of an ad insertion system, in accordance with some implementations. The ad insertion system in diagram 100 may include an ad insertion service 110 configured to receive from the player 105 a request for a manifest 106 associated with live streaming of a live event 120. The request for the manifest 106 may include user's parameters 114. For example, the user's parameters 114 may include information that describes a user's interest or preference. The ad insertion service 110 may be configured to send a request for the manifest 112 to an origin content server 115. The origin content server 115 may be configured to receive live content from a live event 120. Responsive to receiving the request for the manifest 112, the origin content server 115 may be configured to generate manifest 118 and send the manifest 118 to the ad insertion service 110. The manifest 118 may include content fragments and ad breaks.

The ad insertion service 110 may be configured to send the user's parameters 114 to the ad decision server 120. The ad decision server 120 may be configured to select ads 128. Ad selection performed by the ad decision server 120 may be based on selection criteria targeted to a user. The selection criteria may be based on information available to the ad decision server 120. The selection criteria may be based on information received with the request for the manifest. For example, an ad may be selected based on how much an advertiser is willing to pay for their ad to be inserted into the ad break to target the user. As another example, an ad may be selected based on the user's parameters so that the selected ad is relevant to the user's interest. The ads 128 may be stored in the ad database 135 which may be configured to store a plurality of ads. The ads 128 may be sent to the ad insertion service 110. The ad insertion service 110 may be configured to insert the ads 128 into the ad breaks of the manifest 118 to generate the manifest 130. Transcoding operations may be performed to the ads 128 to convert them into a format that matches with a format of the content fragments in the manifest 130. The manifest 130 may then be sent to the player 105. Although not shown, a content distribution network (CDN) may be used by the player 105 to send the request for the manifest 106 to and receive the manifest 130 from the ad insertion service 110.

Figure 2:
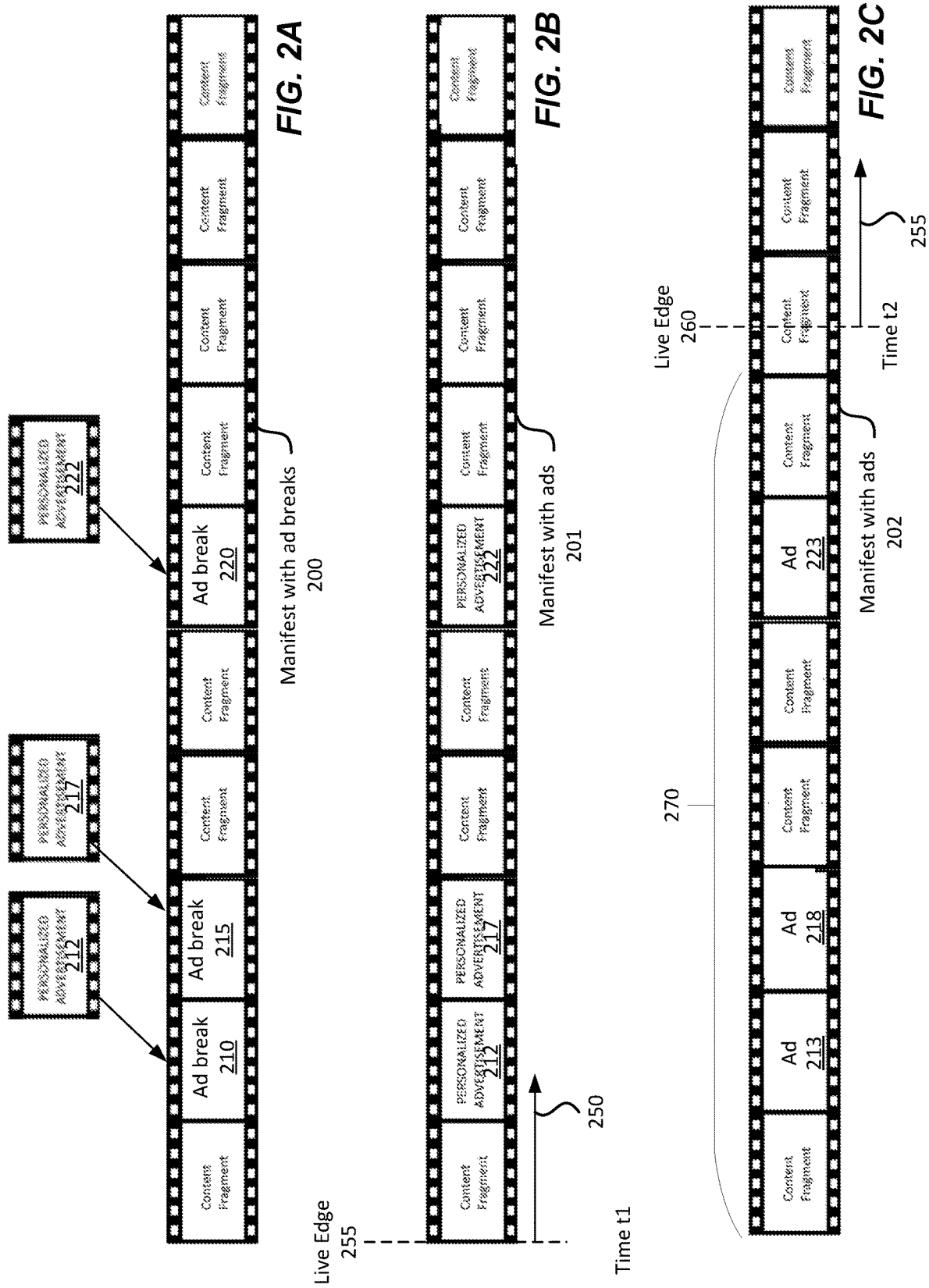
FIGS. 2A, 2B and 2C show examples of a manifest with ad breaks, in accordance with some implementations.

FIG. 2A is an example of a manifest with ad breaks, in accordance with some implementations. The manifest 200 may include multiple content fragments associated with a live event. The manifest 200 may include ad breaks 210, 215 and 220. Each of the ad breaks 210, 215 and 220 of the manifest 200 may be associated with an ad marker. The ad marker may indicate when an ad break starts and a duration of the ad break. For example, the ad marker may indicate that there is an ad break coming up in 5 seconds. The ad marker may be used by the ad insertion service 110 to request for an ad from the ad decision server 125. The duration of the ad break may be used by the ad decision server 125 to select an ad having a duration that may fit the duration of the ad break. It may be possible to insert multiple ads into one ad break provided that the total duration of the multiple ads does not exceed the duration of the ad break.

Ads 212, 217 and 222 may be selected by the ad decision server 125 from the ads database 130. The ads 212, 217 and 222 may be inserted into the ad breaks 210, 215 and 220 by the ad insertion service 110 to generate the manifest 201, as shown in FIG. 2B. The ad insertion process shown in FIG. 2A and FIG. 2B may be referred to as dynamic ad insertion or server-side ad insertion (SSAI). The ads 212, 217 and 222 may be referred to as personalized ads because they may be selected by the ad decision server 125 to target the user.

In some implementations, when a user joins a live stream when the live stream starts, the manifest 201 may include limited number of content fragments and ads. For example, as shown in FIG. 2B, the live stream may start at time t1 and the manifest 201 may not have any content fragment or ad before the live edge 255. When a user joins a live stream when the live stream is already in progress, the content of the live stream that is streamed before the user joins may still be available for the user to watch. For example, the content fragments and ads that are in the group 270 of the manifest 202 shown in FIG. 2C may be available to the user even though the user joins the live stream at time t2, which may correspond to the position of the live edge 260. It may be noted that, when the user joins at time t2, the timeline and the order of the content fragments and ads in the group 270 may not change from when they were streamed earlier. It may also be noted that, when the user joins at time t2, the ads 213, 218 and 223 may be personalized or selected to target the user.

Figure 3:
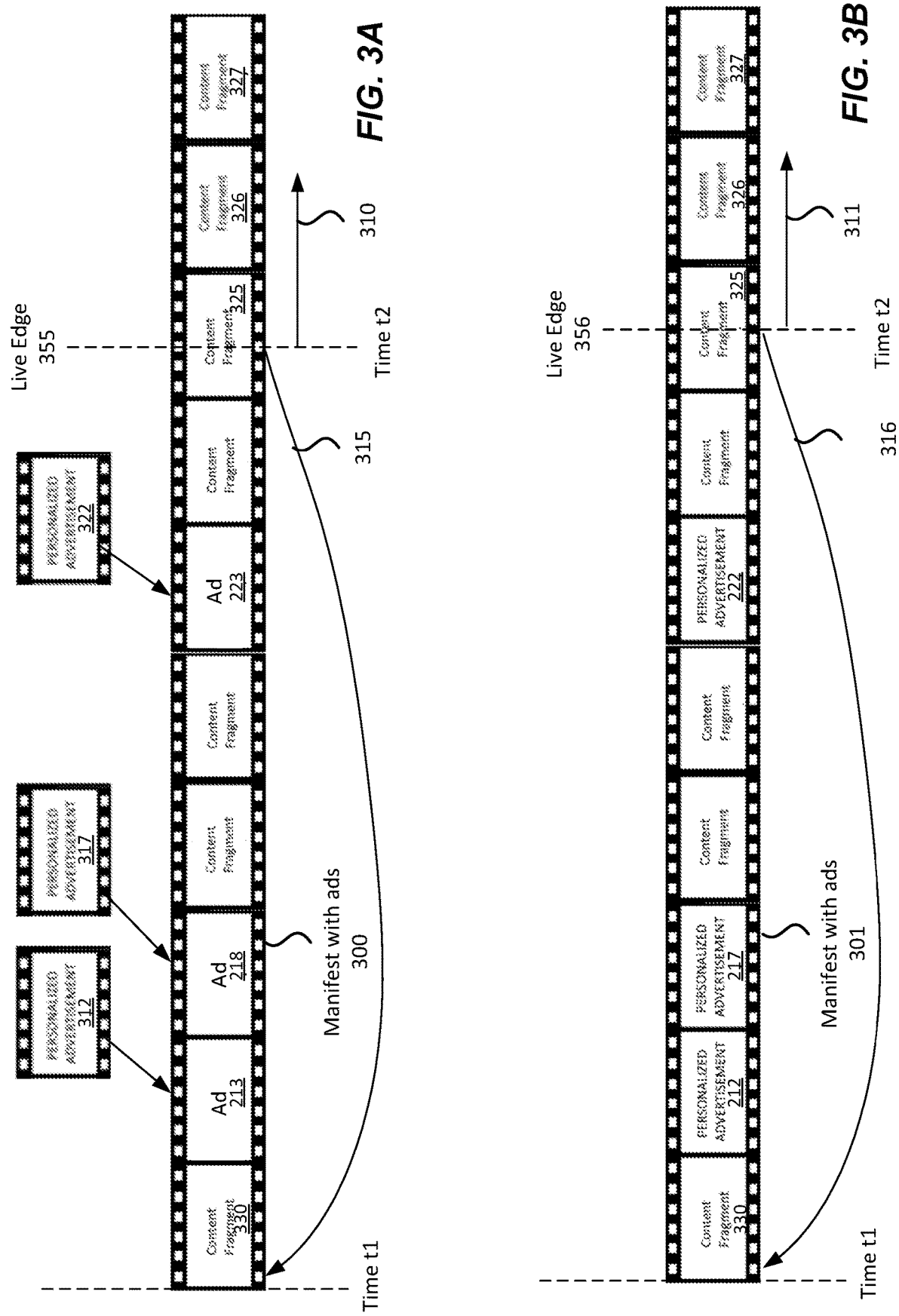
FIGS. 3A and 3B show examples of a seek back request, in accordance with some implementations.

FIGS. 3A and 3B show examples of a seek back, in accordance with some implementations. In FIG. 3A, the manifest 300 may include multiple content fragments and ads. The time t2 may be a current time and may be associated with a live edge 355. A user may join the live stream at time t2 when the live stream is already in progress. The arrow 310 is used to indicate the direction of the content to be streamed. From the live edge 355, when the user decides to watch the live stream in progress, the player may continue with streaming the content fragments 325, 326 and 327.

In some implementations, when a user joins a live stream while it is already in progress, the user may be provided with a manifest that includes content fragments that have been streamed prior to the user joining the live stream. The manifest may also include ads that are selected to target the user. This may allow the user to generate a seek back request to watch the live stream starting at an earlier time. For example, the seek back request 315 may enable the user to move the live edge 355 from the time t2 to the time t1 and stream the content fragment 330.

Watching a live stream starting at an earlier time such as, for example, the time t1 shown in FIG. 3A, after joining the live stream when it is already in progress may include watching ads that have been inserted into the manifest based on the user's seek back request. For example, the ads 213, 218 and 223 shown in FIG. 3A may be ads that are selected based on information that is available when the seek back request is received. In some implementations, when the user starts watching the live stream at the time t1, the ads that the user has not seen may be replaced with more personalized ads. For example, the ads 213, 218 and 223 may be replaced by the ads 312, 317 and 322. The ads 312, 317 and 322 may be selected because they are more targeted to the user than the ads 213, 218 and 223 based on more updated information being available for the ad decision server 125 to use.

In FIG. 3B, the manifest 301 may be similar to the manifest 300, other than the ads 212, 217 and 222. In some implementations, a user may join a live stream from the time t1 and may continue watching the live stream to the time t2. Since the user starts at the time t1, the ads 212, 217 and 222 may have been viewed by the user. When the user decides to watch the live stream from the time t1 to the time t2 again for a second pass, the user may initiate a seek back request 316 at the time t2 to move the live edge 356 from the time t2 to the time t1. The arrow 311 is used to indicate the direction of the content to be streamed. It may be noted that even though the user has already viewed the ads 212, 217 and 222 during the first pass, in some implementations, the ad decision server may replace the ads 212, 217 and 222 with different ads that are more personalized during the second pass. For example, an ad that has already been viewed by the user during the first pass may be replaced by a different ad during the second pass because the replacement ad may be associated with a different advertising revenue.

It may be possible that the user's interest may change while a user is watching a live stream. For example, while watching a live stream, the user may step away and engages in some online transactions that may cause the user's interest to be updated. When the user rejoins the live stream and initiates a seek back request to watch some parts of the live stream again, the ads that the user has watched during a first pass may be replaced with different ads during a second pass based on the updated interest. In some implementations, time-shifted viewing may be used to enable processing the seek back request initiated by the user. Time-shifted viewing may include recording of the live stream into a storage device so that the recording can be viewed after the live stream. For example, the Amazon Web Services (AWS) Elemental Media package product of Amazon Inc. of Seattle, Washington includes the time-shifted viewing feature. It may be noted that the replacement of the ads 213, 218 and 223 shown in FIG. 3A with the ads 312, 317 and 322 may not be noticeable to the user and may not affect the user experience provided the duration of the ads are similar.

Figure 4:
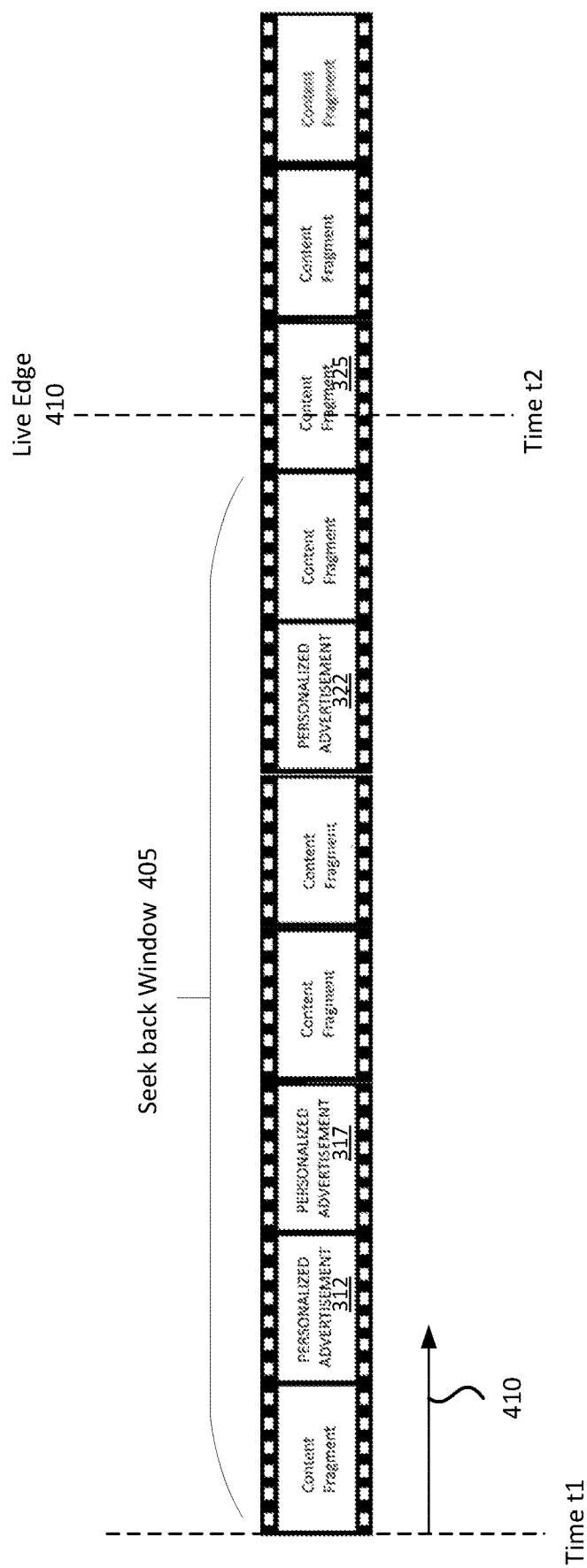
FIG. 4 shows an example of a seek back window, in accordance with some implementations.

FIG. 4 shows an example of a seek back window, in accordance with some implementations. A seek back request may be associated with a seek back window 405 which may start at a seek back time (e.g., time t1) and may end at a current time (e.g., time t2). In some implementations, advertisements that are included within the seek back window 405 may be replaced with replacement ads. For example, the ads 312, 317 and 322 may be replaced.

In some implementations, a seek back threshold may be used to limit how far a user can seek back for the live stream. For example, the seek back threshold may be set at 30 minutes. A seek back request to a time t1 that exceeds the seek back threshold or the seek back window 405 from the time t2 may be rejected. When the seek back request is successfully processed, the live edge may be updated to reflect the beginning of the seek back window 405. The end of the seek back window 405 may be the time t2. The arrow 410 is used to indicate the direction of the content to be streamed subsequent to processing the seek back request. In some implementations, a seek back request that seek back to a time prior to the start time of the live stream may be rejected.

Figure 5A:
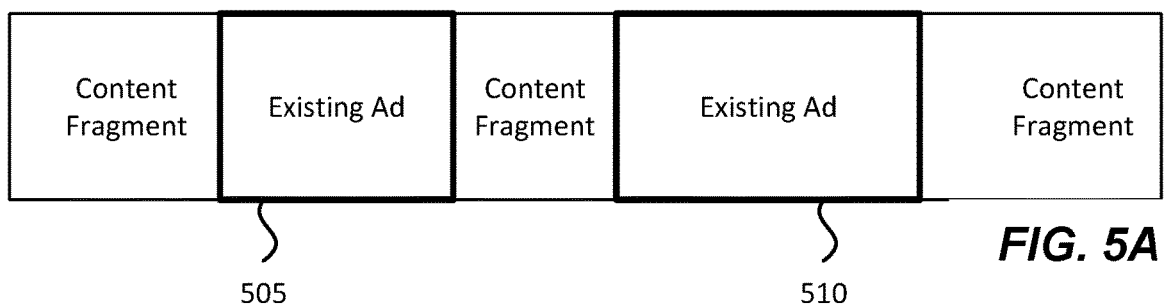
FIGS. 5A, 5B, 5C and 5D show different examples of just-in-time ad insertion for a live stream, in accordance with some implementations.
Figure 5B:
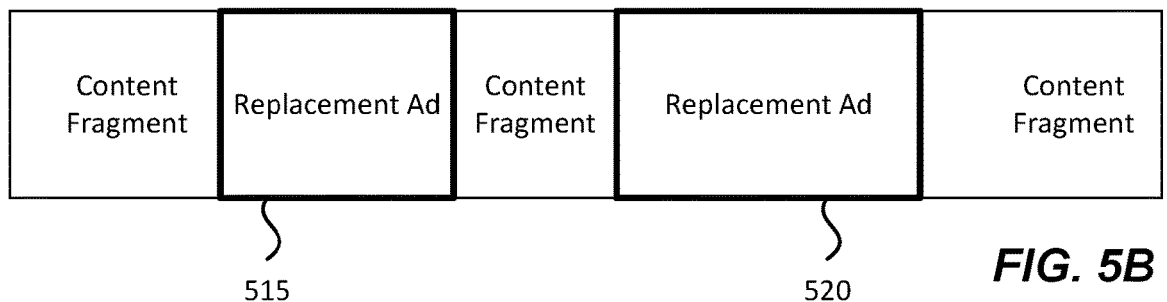

FIGS. 5A, 5B, 5C and 5D show different examples of just-in-time ad insertion for a live stream, in accordance with some implementations. In FIG. 5A, a manifest is shown to include two ad breaks that have been inserted with ads 505 and 510. The ads 505 and 510 may be referred to as existing ads because they are the original ads inserted into the ad breaks when the manifest is manipulated by the ad insertion service 110. In FIG. 5B, a manifest is shown to include the same two ad breaks as the manifest shown in FIG. 5A. The existing ads 505 and 510 in the two ad breaks may be replaced with the replacement ads 515 and 520.

In some implementations, a replacement ad may not have a duration that is longer than a duration associated with the ad break. The replacement of the existing ads 505 and 510 may be based on the player receiving a seek back request. It may be noted that the replacement ads 515 and 520 may have substantially similar duration as the existing ads 505 and 510 or the corresponding ad break.

Figure 5C:
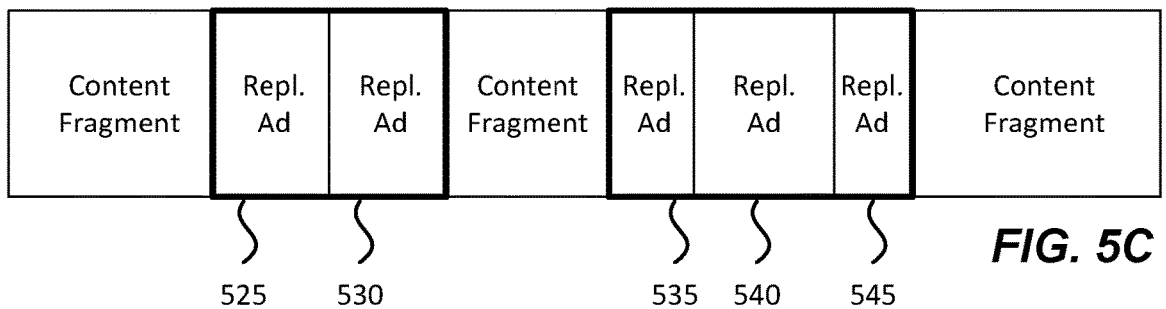

In FIG. 5C, a manifest is shown to include the same two ad breaks as the manifest shown in FIG. 5A. In some implementations, an existing ad may be replaced with two or more replacement ads provided the total duration of the replacement ads may not exceed the duration of the associated ad break. In the first ad break, the existing ad 505 may be replaced by two replacement ads 525 and 530. The total duration of the two replacement ads 525 and 530 may be similar to the duration of the existing ad 505 or the duration of the first ad break. In the second ad break, the existing ad 510 may be replaced by three replacement ads 535, 540 and 545. The total duration of the three replacement ads 535, 540 and 545 is similar to the duration of the existing ad 510 or the duration of the second ad break.

Figure 5D:
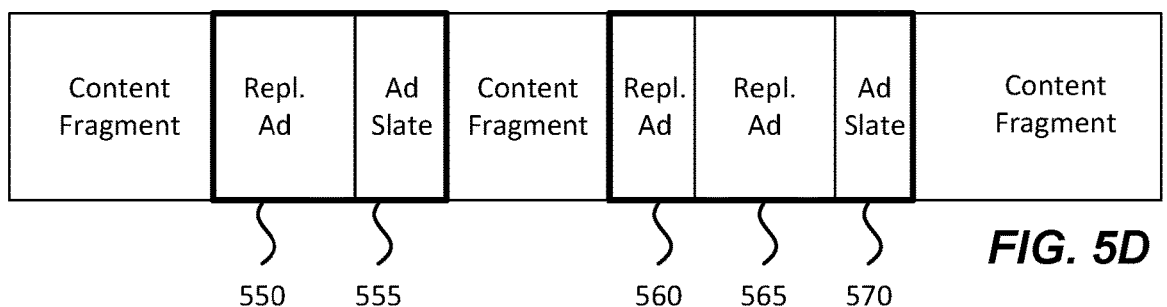

In FIG. 5D, a manifest is shown to include the same two ad breaks as the manifest shown in FIG. 5A. In some implementations, an ad slate may be used to fill a gap that may exist in an ad break. For example, the gap may exist because there is not an ad that has a duration that fits the duration associated with the gap. For example, the ad slate may be an image. In the first ad break, the existing ad 505 may be replaced with a replacement ad 550 and an ad slate 555. The total duration of the new ad 550 and the ad slate 555 may be similar to the duration of the existing ad 505 or of the first ad break. In the second ad break, the existing ad 510 may be replaced with the replacement ads 560 and 565 and the ad slate 570. The total duration of the replacement ads 560 and 565 and the ad slate 570 may be similar to the duration of the existing ad 510 or of the second ad break. In some implementations, in a situation when an ad slate is not available to fit the gap, the playback of the underlying content may resume.

Figure 6A:
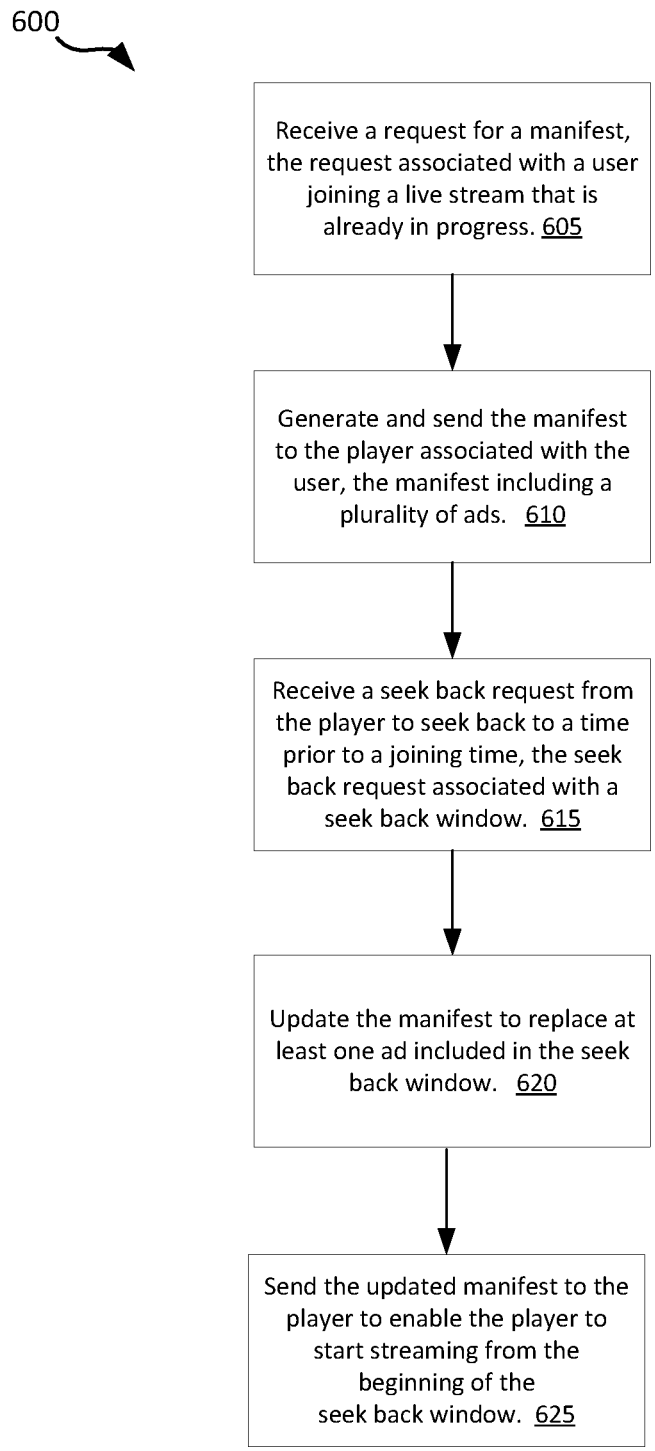
FIG. 6A shows an example process that may be performed to update a manifest for a user who joins a live stream that is already in progress, in accordance with some implementations.

FIG. 6A shows an example process that may be performed to update a manifest for a user joining a live stream that is already in progress, in accordance with some implementations. The process 600 may be performed by an ad insertion service and may start at block 605 when a request for a manifest is received from a player associated with a user. The manifest is for a live stream, and the user joins the live stream when the live stream is already in progress. At block 610, a manifest may be generated. The manifest may include content fragments and ads. In some implementations, since the user joins the live stream while the live stream is already in progress, the manifest may include ads that are selected based on the information available at the time the user joins the live stream. For example, this may include information about how much advertisers are willing to pay to have their ads inserted. This may include information about the user that the ad selection server may have at the time. The manifest may then be sent to the player for streaming.

At block 615, a seek back request may be received from the player. The seek back request may be initiated by the user to seek back to a time earlier to the time that the user joins the live stream. For example, the user may select a seek back option using a user interface associated with the player and seek to a time 30 minutes before the user joins the live stream, or the user may seek back to the beginning of the live stream. The seek back request may be associated with a seek back window.

At block 620, at least one ad included in the seek back window may be replaced with a different ad. For example, an ad that is inserted in the manifest when the user joins the live stream may be an ad selected based on information that is available at that time. The ad that is in the manifest may be replaced with an ad that is more personalized or targeted to the user based on more updated information available after the seek back request is received. It may be noted that the replacement of an ad that is in the manifest may need to comply with duration requirement such that a replacement ad may fit in an ad break without causing any shifting to any other ads or to any other content fragments. As described with FIGS. 5B and 5C, it may be possible to replace one existing ad with a replacement ad of the same duration or with two or more replacement ads with the same duration. At block 625, the manifest with the replacement ad may be sent to the player to start streaming from a time associated with the beginning of the seek back window.

Figure 6B:
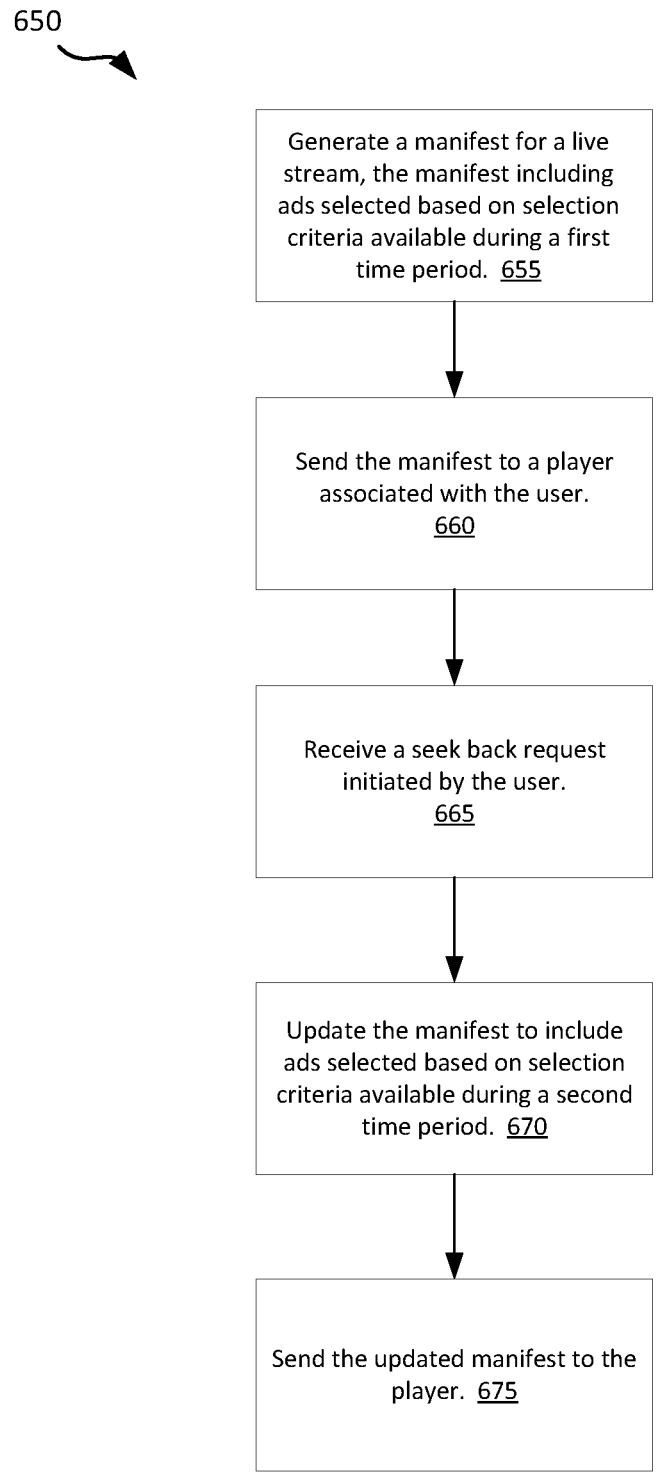
FIG. 6B shows an example process that may be performed to update a manifest using updated selection criteria, in accordance with some implementations.

FIG. 6B shows an example process that may be performed to update a manifest using updated selection criteria, in accordance with some implementations. The process 650 may be performed by the ad decision server and may start at block 655 when a manifest for a live stream may be generated. The manifest may include ads selected based on selection criteria available during a first time period. At block 660, the manifest may be sent to a player to start streaming. While the player is streaming, the selection criteria used by the ad decision server may be updated. For example, the change in the selection criteria may reflect a different revenue factor associated with replacement ads, or it may be due to the user engaging in online transactions that may provide more insight into the user's interest.

At block 665, a seek back request may be received from the player. The seek back request may be initiated by a user associated with the player and may be processed by the ad insertion service 110. At block 670, the manifest may be updated using ads selected based on selection criteria available during a second time period. For example, the selection criteria available during the second time period may be more updated than the selection criteria available during the first time period. At block 675, the updated manifest including the replacement ads may be sent to the player for streaming starting at a seek back time.

Figure 7:
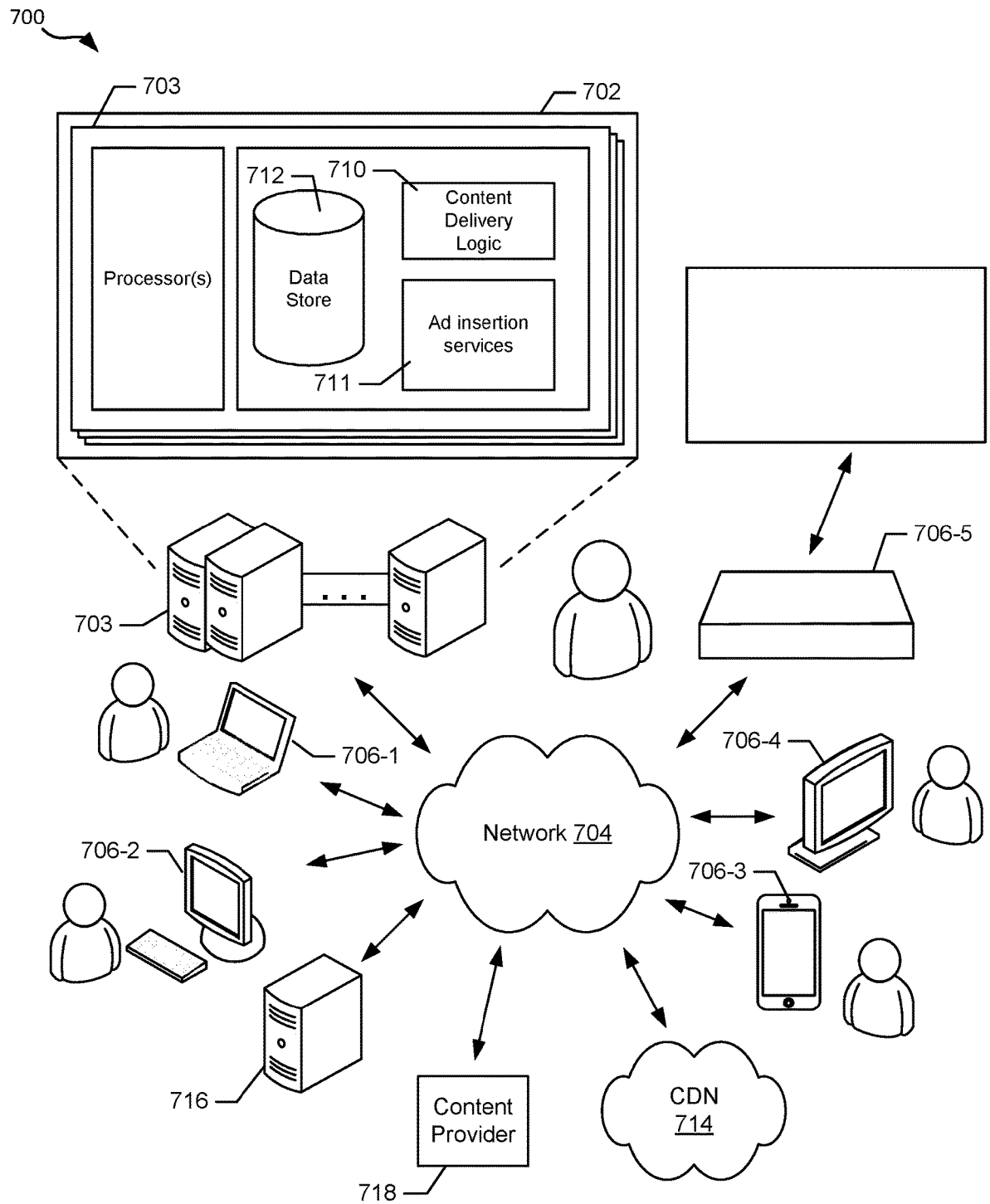
FIG. 7 shows a diagram of an example computing environment that may be used with some implementations.

FIG. 7 shows a diagram of an example computing environment that may be used with some implementations. Diagram 700 includes a computing environment in which a video content service 702 provides video content via network 704 to a variety of client devices (706-1 through 706-5) in accordance with the techniques described herein. The video content may include live or broadcast content or video-on-demand (VOD) content. In various implementations, the video content may be a video presentation of a live event (e.g., a livestream, broadcast, and/or camera feed of an ongoing live event and/or a recording of a partially or fully-completed event which may also be referred to as formerly-live event). Content service 702 may conform to any of a wide variety of architectures such as, for example, a services platform deployed at one or more co-locations, each implemented with one or more servers 703. Network 704 represents any subset or combination of a wide variety of network environments including, for example, TCP/UDP over IP-based networks, unicast/multicast/broadcast networks, telecommunications networks, wireless networks, satellite networks, cable networks, public networks, private networks, wide area networks, local area networks, the Internet, the World Wide Web, intranets, extranets, and so on. Client devices 706 may be any suitable device capable of connecting to network 704 and consuming content provided by service 702. Such devices may include, for example, mobile devices (e.g., cell phones, smart phones, and tablets), personal computers (e.g., laptops and desktops), set top boxes (e.g., for cable, satellite, and online systems), smart televisions, digital assistant devices, gaming consoles, wearable computing devices (e.g., smart watches or smart glasses), etc.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling content service 702. Alternatively, such resources may be independent of content service 702, e.g., on a platform under control of a separate provider of computing resources with which content service 702 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

In the examples herein and for the sake of simplicity, content service 702 is described as if it is integrated with the platform(s) that provides both broadcast content and VOD-style content to client devices. However, it will be understood that content service 702 may provide access to content in conjunction with one or more content delivery networks (e.g., CDN 714) that may or may not be independent of content service 702. In addition, the source(s) of one or both of the broadcast and VOD-style content may or may not be independent of content service 702 (e.g., as represented by content provider server 716, and live content provider 718). The range of variations known to those of skill in the art are contemplated to be within the scope of this disclosure.

Some of the implementations enabled by the present disclosure contemplate logic resident on the client devices consuming video content from content service 702; such logic might be configured to handle, for example, requesting smaller chunks of subtitle files. Such logic might be part of an existing algorithm or module on the client device or implemented to work in conjunction with such an algorithm or module.

It should also be noted that implementations are contemplated in which, in addition to content delivery logic 710 (which facilitates various aspects of content delivery to client devices 706), content service 702 may include other types of logic, e.g., ad insertion logic 711 that facilitates selecting and inserting ads into ad breaks of a manifest. Although the ad insertion logic 711 is shown to be associated with the content service 702, it may be possible that the ad insertion logic 711 is associated with the content service 702 and/or a third-party service.

In addition to providing access to video content, content service 702 may also include a variety of information related to the video content. Alternatively, such information associated with and/or about the content, as well as the content itself may be provided and/or hosted by one or more separate platforms, e.g., CDN 714. It should be noted that, while logic 710 and 711, and data store 712 are shown as integrated with content service 702, implementations are contemplated in which some or all of these operate remotely from the associated content service, and/or are under the control of an independent entity. From these examples, those of skill in the art will understand the diversity of use cases to which the techniques described herein are applicable.

Although implementations have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain implementations could include, while other implementations do not include, certain features, elements, and/or steps. Thus, such conditional language is not generally intended to imply that features, elements, and/or steps are in any way required for one or more implementations or that one or more implementations necessarily include logic for deciding, with or without user input or prompting, whether these features, elements, and/or steps are included or are to be performed in any particular implementation.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method comprising:
receiving a request for a manifest from a player to enable a user to watch a live stream of an event, the request received at a first time when the live stream is in progress;
generating the manifest to include content fragments associated with the live stream and a first set of advertisements, the first set of advertisements selected based on selection criteria available when the request for the manifest is received;
sending the manifest to the player to enable the user to watch the live stream;
receiving a seek back request from the player, the seek back request initiated by the user to watch the live stream at a second time earlier than the first time;
in response to the seek back request, updating the manifest to replace at least one advertisement in the first set of advertisements included in the manifest with one or more replacement advertisements; and
after updating the manifest, sending the updated manifest to the player to enable the user to watch the live stream and the one or more replacement advertisements starting from the second time.

2. The method of claim 1, further comprising selecting the one or more replacement advertisements based on updated selection criteria available when the seek back request is received.

3. The method of claim 1, further comprising, in response to the seek back request, updating the manifest to include additional content fragments associated with the live stream before the first time.

4. The method of claim 1, wherein the advertisement being replaced is selected based on a different revenue factor from how the one or more replacement ads are selected.

5. The method of claim 1, wherein the advertisement being replaced is an advertisement that has not been watched by the user.

6. The method of claim 1, wherein the seek back request is processed using time-shifted viewing.

7. The system of claim 1, further comprising, in response to the seek back request, updating the manifest to include additional content fragments associated with the live stream before the first time.

8. The method of claim 3, wherein the one or more replacement advertisements are selected based on their duration, a duration of an ad slate, and the duration of the advertisement being replaced.

9. A computer-implemented method comprising:
generating a manifest for a live stream, the manifest including advertisements selected based on a first set of selection criteria;
sending the manifest to a player to enable a user associated with the player to watch the live stream;
receiving a seek back request from the player, the seek back request initiated by the user to enable the user to watch a portion of the live stream again starting from a time earlier than a current time; and
in response to the seek back request, updating the manifest to replace at least one of the advertisements selected based on the first set of selection criteria with one or more advertisements selected based on a second set of selection criteria; and
after updating the manifest, sending the updated manifest to the player to enable the user to watch the live stream and the one or more advertisements selected based on the second set of selection criteria starting from the time earlier than the current time.

10. The method of claim 9, further comprising sending the updated manifest to the player to enable the user to watch the portion of the live stream again from the time earlier than the current time, wherein the one or more advertisements selected based on the second set of selection criteria have substantially similar duration as the at least one advertisement selected based on the first set of selection criteria.

11. The method of claim 9, further comprising:
receiving a request for the manifest for the live stream, the request for the manifest received when the live stream is already in progress, and
in response to the seek back request, updating the manifest to include additional content fragments associated with the live stream before the current time to enable the user to watch the live stream starting from the time earlier than the current time.

12. The method of claim 9, wherein the seek back request is processed using time-shifted viewing.

13. The method of claim 9, wherein one or more ad slates are used to update the manifest to replace the at least one advertisement selected based on the first set of selection criteria with the one or more advertisements selected based on the second set of selection criteria.

14. The method of claim 9, wherein the at least one of the advertisements being replaced has not been viewed by the user.

15. A system comprising:
memory configured to store computer-executable instructions; and
at least one computer processor configured to access the memory and execute the computer-executable instructions to:
receive a request for a manifest from a player to enable a user to watch a live stream of an event, the request received at a first time when the live stream is in progress;
generate the manifest to include content fragments associated with the live stream and a first set of advertisements, the first set of advertisements selected based on selection criteria available when the request for the manifest is received;
send the manifest to the player to enable the user to watch the live stream;
receive a seek back request from the player, the seek back request initiated by the user to watch the live stream at a second time earlier than the first time;
in response to the seek back request, update the manifest to replace at least one advertisement in the first set of advertisements included in the manifest with one or more replacement advertisements; and after updating the manifest, send the updated manifest to the player to enable the user to watch the live stream and the one or more replacement advertisements starting from the second time.

16. The system of claim 15, further comprising instructions to select the one or more replacement advertisements based on updated selection criteria available when the seek back request is received.

17. The system of claim 15, wherein the advertisement being replaced is selected based on a different revenue factor from how the one or more replacement ads are selected.

18. The system of claim 15, wherein the advertisement being replaced is an advertisement that has not been watched by the user.

19. The system of claim 15, wherein the seek back request is processed using time-shifted viewing.

20. The system of claim 7, wherein the one or more replacement advertisements are selected based on their duration, a duration of an ad slate, and the duration of the advertisement being replaced.

* * * * *